US008791933B2

(12) United States Patent
Setoguchi et al.

(10) Patent No.: US 8,791,933 B2
(45) Date of Patent: Jul. 29, 2014

(54) METHOD FOR DRIVING PLASMA DISPLAY PANEL

(71) Applicant: Hitachi Consumer Electronics Co., Ltd., Tokyo (JP)

(72) Inventors: Noriaki Setoguchi, Kagoshima (JP); Shigeharu Asao, Kawasaki (JP); Yoshikazu Kanazawa, Kawasaki (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 0 days.

(21) Appl. No.: 14/036,720

(22) Filed: Sep. 25, 2013

(65) Prior Publication Data

US 2014/0022224 A1 Jan. 23, 2014

Related U.S. Application Data

(63) Continuation of application No. 11/842,649, filed on Aug. 21, 2007, now Pat. No. 8,558,761, which is a continuation of application No. 11/224,999, filed on Sep. 14, 2005, now Pat. No. 7,345,667, which is a continuation of application No. 10/748,328, filed on Dec. 31, 2003, now Pat. No. 7,009,585, which is a continuation of application No. 09/334,623, filed on Jun. 17, 1999, now Pat. No. 6,707,436.

(30) Foreign Application Priority Data

Jun. 18, 1998 (JP) .................................... 10-170825
Mar. 9, 1999 (JP) .................................... 11-061660

(51) Int. Cl.
*G06F 3/038* (2013.01)
*G09G 5/00* (2006.01)
*G09G 3/28* (2013.01)

(52) U.S. Cl.
USPC ................................ 345/208; 345/60; 345/63

(58) Field of Classification Search
USPC ........................................................ 345/208
See application file for complete search history.

(56) References Cited

U.S. PATENT DOCUMENTS 3,803,440 A 4/1974 Andoh et al.
3,906,451 A 9/1975 Strom (Continued)

FOREIGN PATENT DOCUMENTS

EP 0 680 067 A2 11/1995
EP 0 762 373 3/1997

(Continued)

OTHER PUBLICATIONS

Notice of Allowance mailed Jun. 12, 2013 in co-pending U.S. Appl. No. 11/842,649.

(Continued)

*Primary Examiner* — Charles V Hicks
(74) *Attorney, Agent, or Firm* — Staas & Halsey LLP

(57) ABSTRACT

A method is provided for driving a plasma display panel having parallel first and second electrodes, third electrodes crossing the first and second electrodes, and discharge cells with electrodes crossing mutually in the form of a matrix. The method includes a reset period during which distribution of wall charges in the discharge cells is uniformed, an addressing period during which wall charges are produced in the discharge cells according to display data, and a sustain discharge period during which sustain discharge is induced in discharge cells in which wall charges are produced during the addressing period. The driving method includes during the reset period, in lines defined by the first and second electrodes, applying a first pulse, in which an applied voltage varies with time to induce first discharge, and applying a second pulse in which an applied voltage varies with time to induce second discharge as an erase discharge.

5 Claims, 12 Drawing Sheets

(56) References Cited

U.S. PATENT DOCUMENTS

| | | | | |
|---|---|---|---|---|
| 3,935,494 | A | 1/1976 | Dick et al. | |
| 4,063,131 | A | 12/1977 | Miller | |
| 4,070,663 | A | 1/1978 | Kanatani et al. | |
| 4,206,386 | A | 6/1980 | Akutsu et al. | |
| 4,320,418 | A | 3/1982 | Pavliscak | |
| 4,347,509 | A | 8/1982 | Hardway et al. | |
| 4,392,075 | A | 7/1983 | Kamegaya et al. | |
| 4,429,303 | A | 1/1984 | Aboelfotoh | |
| 4,496,879 | A | 1/1985 | Suste | |
| 4,516,053 | A | 5/1985 | Amano | |
| 4,529,909 | A | 7/1985 | Kamegaya et al. | |
| 4,534,744 | A | 8/1985 | Kuznetzoff | |
| 4,554,537 | A | 11/1985 | Dick | |
| 4,611,203 | A | 9/1986 | Criscimagna et al. | |
| 4,692,666 | A | 9/1987 | Okamoto et al. | |
| 4,728,864 | A | 3/1988 | Dick | |
| 4,827,186 | A | 5/1989 | Knauer et al. | |
| 4,833,463 | A | 5/1989 | Dick et al. | |
| 4,866,349 | A | 9/1989 | Weber et al. | |
| 4,914,352 | A | 4/1990 | Gay et al. | |
| 5,030,888 | A | 7/1991 | Salavin et al. | |
| 5,066,890 | A | 11/1991 | Salavin et al. | |
| 5,075,597 | A | 12/1991 | Salavin et al. | |
| 5,086,297 | A | 2/1992 | Miyake et al. | |
| 5,116,271 | A | 5/1992 | Arimoto | |
| 5,150,007 | A | 9/1992 | Andreadakis | |
| 5,182,489 | A | 1/1993 | Sano | |
| 5,656,893 | A | 8/1997 | Shino et al. | |
| 5,663,741 | A | 9/1997 | Kanazawa | |
| 5,745,086 | A | 4/1998 | Weber | |
| 5,790,087 | A | 8/1998 | Shigeta et al. | |
| 5,852,347 | A | 12/1998 | Marcotte | |
| 5,877,734 | A | 3/1999 | Amemiya | |
| 5,943,031 | A | 8/1999 | Tokunaga et al. | |
| 5,952,986 | A | 9/1999 | Nguyen et al. | |
| 5,969,478 | A | 10/1999 | Shino et al. | |
| 5,982,344 | A | 11/1999 | Tokunaga | |
| 6,020,687 | A | 2/2000 | Hirakawa et al. | |
| 6,034,482 | A | 3/2000 | Kanazawa et al. | |
| 6,072,448 | A | 6/2000 | Kojima et al. | |
| 6,097,358 | A | 8/2000 | Hirakawa et al. | |
| 6,160,529 | A | 12/2000 | Asao et al. | |
| 6,160,530 | A | 12/2000 | Makino | |
| 6,184,848 | B1 | 2/2001 | Weber | |
| 6,195,072 | B1 | 2/2001 | Iwami et al. | |
| 6,211,865 | B1 | 4/2001 | Hosoi et al. | |
| 6,243,084 | B1 | 6/2001 | Nagai | |
| 6,252,568 | B1 | 6/2001 | Iseki et al. | |
| 6,256,001 | B1 * | 7/2001 | Kim et al. | 345/60 |
| 6,256,002 | B1 | 7/2001 | Shinoda | |
| 6,262,699 | B1 | 7/2001 | Suzuki et al. | |
| 6,294,875 | B1 | 9/2001 | Kurata et al. | |
| 6,320,560 | B1 | 11/2001 | Sasaki et al. | |
| 6,342,874 | B1 | 1/2002 | Tokunaga et al. | |
| 6,414,653 | B1 | 7/2002 | Kobayashi | |
| 6,448,960 | B1 | 9/2002 | Shigeta | |
| 6,456,263 | B1 | 9/2002 | Hashimoto et al. | |
| 6,483,251 | B2 | 11/2002 | Setoguchi et al. | |
| 6,512,501 | B1 | 1/2003 | Nagaoka et al. | |
| 6,603,447 | B1 | 8/2003 | Ito et al. | |
| 6,614,413 | B2 | 9/2003 | Tokunaga et al. | |
| 6,621,229 | B2 | 9/2003 | Kanazawa et al. | |
| 6,707,436 | B2 | 3/2004 | Setoguchi et al. | |
| 6,738,033 | B1 | 5/2004 | Hibino et al. | |
| 6,836,261 | B1 | 12/2004 | Kishi et al. | |
| 7,009,585 | B2 | 3/2006 | Setoguchi et al. | |
| 7,345,667 | B2 | 3/2008 | Setoguchi et al. | |
| 2004/0252080 | A1 | 12/2004 | Marcotte et al. | |

FOREIGN PATENT DOCUMENTS

| | | |
|---|---|---|
| EP | 0782167 | 7/1997 |
| EP | 0 554 172 | 4/1998 |
| EP | 0 836 171 | 4/1998 |
| EP | 0 855 691 | 7/1998 |
| EP | 0 855 692 | 7/1998 |
| JP | 49-106230 | 10/1974 |
| JP | 49-115242 | 11/1974 |
| JP | 51-32051 | 3/1976 |
| JP | S63-32830 | 7/1986 |
| JP | 1-211243 | 8/1989 |
| JP | 1-276531 | 11/1989 |
| JP | 2-73395 | 3/1990 |
| JP | 2-148645 | 6/1990 |
| JP | 2-220330 | 9/1990 |
| JP | 2-291597 | 12/1990 |
| JP | 3-250536 | 11/1991 |
| JP | 3-269933 | 12/1991 |
| JP | 4-134401 | 5/1992 |
| JP | 4-249032 | 9/1992 |
| JP | 4-312742 | 11/1992 |
| JP | 5-325793 | 12/1993 |
| JP | 6-175607 | 6/1994 |
| JP | 6-314078 | 11/1994 |
| JP | 7-175438 | 7/1995 |
| JP | 8-160910 | 6/1996 |
| JP | 8-160912 | 6/1996 |
| JP | 9-6280 | 1/1997 |
| JP | 9-160525 | 6/1997 |
| JP | 10-091116 | 4/1998 |
| JP | 10-105111 | 4/1998 |
| JP | 10-143107 | 5/1998 |
| JP | 10-177363 | 6/1998 |
| JP | 10-188824 | 7/1998 |
| JP | 10-214057 | 8/1998 |
| JP | 10-222119 | 8/1998 |
| JP | 10-307560 | 11/1998 |
| JP | 2000-214823 | 8/2000 |
| JP | 2000-267625 | 9/2000 |
| WO | 97 20301 A | 6/1997 |

OTHER PUBLICATIONS

Office Action mailed Apr. 22, 2009; U.S. Appl. No. 11/334,515.
Office Action mailed Sep. 16, 2009; U.S. Appl. No. 11/334,515.
Communication mailed Apr. 5, 2007; U.S. Appl. No. 11/224,999.
Notice of Allowance mailed Jun. 4, 2007; U.S. Appl. No. 11/224,999.
Office Action mailed Jun. 15, 2005; U.S. Appl. No. 10/748,328.
Notice of Allowance mailed Sep. 28, 2005; U.S. Appl. No. 10/748,328.
Office Action mailed Jan. 16, 2004; U.S. Appl. No. 09/334,623.
Notice of Allowance mailed Sep. 3, 2003; U.S. Appl. No. 09/334,623.
Office Action mailed Feb. 5, 2003; U.S. Appl. No. 09/334,623.
Office Action mailed Apr. 25, 2001; U.S. Appl. No. 09/334,623.
Final Office Action mailed Mar. 21, 2002; U.S. Appl. No. 09/334,623.
Larry F. Weber, "Plasma Display Device Challenges", Proceedings of the 18$^{th}$ International Display Research Conference, Sep. 28-Oct. 1, 1998, pp. 15-27.
Y.B. Song, et al., "P-45: Fast Addressing in Color PDPs by Multiple-Erase-Scanning and Picture-Quality-Enhancement Techniques", ISSNO098, May 1, 1998.
Abandoned Application, U.S. Appl. No. 09/159,211, filed Sep. 23, 1998.
Larry F. Weber, "Plasma Display Device Challenges", Proceedings of the 18$^{th}$ International Display Research Conference, Asia Display '98, pp. 15-27, Sep. 28-Oct. 1, 1998.
Y. Sano et al., "A Full-Color Surface-Discharge ac Plasma TV Display", SID International Symposium, Digest of Technical Papers, May 6, 1991, pp. 728-731.
T. Okajima et al., "A High Luminance Direct View Color AC-Plasma Display", Conference Record of the 1991 International Display Research Conference, Oct. 15-17, 1991, pp. 39-42.
Masanori Fukuda et al., "A New Color ac Plasma Display Panel with Barrier-Type Electrodes", SID International Symposium, Digest of Technical Papers, May 6, 1991, pp. 732-735.
T. Shinoda et al., "Green Surface-Discharge Plasma Decode Displays", Conference Record of the 1985 International Display Research Conference, Oct. 15-17, 1985, pp. 51-54.

(56) References Cited

OTHER PUBLICATIONS

"Program of 1996 National Convention of the Institute of Electrical Engineers of Japan", I.E.E Japan, Mar. 29, 1996, pp. 1-11.
George W. Dick, "Three-Electrode-Per-Pel AC Plasma Display Panel", IEEE Transactions on Electron Devices, vol. ED-33, No. 8, Aug. 1, 1986, pp. 1169-1173.
The LGE Defendants' Preliminary Invalidity Contentions, Nov. 26, 2007.
Office Action mailed Aug. 6, 2010 in co-pending U.S. Appl. No. 11/842,649.
Office Action mailed Mar. 9, 2011 in co-pending U.S. Appl. No. 11/842,649.
Notice of Allowance mailed Jun. 12, 2013 in co-pending U.S. Appl. No. 11/842, 649.
Notice of Allowance mailed Jul. 22, 2010 in related U.S. Appl. No. 11/842,683.
Notice of Allowance mailed Aug. 21, 2013 in related U.S. Appl. No. 13/137,354.
Notice of Allowance mailed May 6, 2011 in co-pending U.S. Appl. No. 11/842,713.
Notice of Allowance mailed May 10, 2011 in co-pending U.S. Appl. No. 11/842,734.
Korean Patent Office action, mailed Jul. 18, 2007 and issued in corresponding Korean Patent Application No. 10-2006-0120365.
Office Action mailed Mar. 26, 2012 in co-pending U.S. Appl. No. 13/137,354.
European Office Action dated Jan. 9, 2012 issued in related European Patent Application No. 04010431.7.
European Office Action dated Jan. 9, 2012 issued in related European Patent Application No. 04030776.1.
Memorandum Opinion and Order of Case No. 2:07-CV0155-CE, May 7, 2009.
Defendant's First Amended Answer and Counterclaims for Case No. 2:07-CV0155-CE, Nov. 21, 2008.
Report of Robert G. Marcotte, Regarding the Development of Reset Waveforms at Plasmaco for Case No. 2:07-CV0155-CE, May 29, 2009.
"Service Manual", Panasonic 00089-000236, Jan. 24, 2000.
Office Action mailed Mar. 15, 2013 in co-pending U.S. Appl. No. 11/842,649.
Notice of Allowance mailed Nov. 1, 2010; U.S. Appl. No. 11/842,683.
Notice of Allowance mailed Dec. 6, 2010; U.S. Appl. No. 11/842,570.

* cited by examiner

METHOD FOR DRIVING PLASMA DISPLAY PANEL

CROSS-REFERENCE TO RELATED APPLICATIONS

This application is a Continuation of application Ser. No. 11/842,649, filed Aug. 21, 2007, now pending, which is a Continuation of Ser. No. 11/224,999, filed Sep. 14, 2005, now issued as U.S. Pat. No. 7,345,667, which is a Continuation of application Ser. No. 10/748,328, filed Dec. 31, 2003, now issued as U.S. Pat. No. 7,009,585, which is a Continuation of application Ser. No. 09/334,623 filed, Jun. 17, 1999, now issued as U.S. Pat. No. 6,707,436 and claims the benefit of Japanese Patent Application No. 10-170825, filed Jun. 18, 1998, and Japanese Patent Application No. 11-61660, filed Mar. 9, 1999 in the Japanese Patent Office, the disclosures of which are incorporated herein by reference.

BACKGROUND OF THE INVENTION

1. Field of the Invention

The present invention relates to a method for driving a plasma display panel (PDP).

The PDP is a self-luminous type display device with a characteristic good discernment (i.e., high resolution) and with a thin and large display screen. The PDP is attracting attention as a display device with which CRTs will be replaced in the near future. In particular, a surface discharge AC type PDP is highly expected to be a display device compatible with high-quality digital broadcasting, because it can be designed to have a large display screen. The surface discharge AC type PDP will be required to provide a higher quality than a CRT.

A high-quality display may be construed as a high-definition display, a display with a large number of gray-scale levels, a high-luminance display, or a high-contrast display. A high-definition display is accomplished by setting the pitch between pixels to a small value. A display with a large number of gray-scale levels is accomplished by increasing the number of sub-fields within a frame. Moreover, a high-luminance display is accomplished by increasing the amount of visible light permitted by certain power or increasing the number of times of sustain discharge. Furthermore, a high-contrast display is accomplished by minimizing the reflectance of extraneous light from the surface of a display panel or minimizing an amount of glow that occurs during black display which does not contribute to the display.

2. Description of the Related Art

The structure of a conventional plasma display panel and a conventional method for driving a plasma display panel will be described with reference to FIG. 1 to FIG. 4 to be described later in "BRIEF DESCRIPTION OF THE DRAWINGS". This is intended to facilitate an understanding of problems underlying the conventional method for driving a plasma display panel.

FIG. 1 schematically shows the structure of a surface discharge type PDP in which a method, filed for a patent by the present applicant, is implemented. According to the method, lines defined by all sustain discharge electrodes are involved in display. The structure of the PDP has been disclosed in, for example, the specification and drawings of Japanese Unexamined Patent Publication No. 9-160525 published on Jun. 20, 1997.

A PDP 1 consists of sustain discharge electrodes X1 to X3 (hereinafter abbreviated to XI to X3 electrodes) and Y1 to Y3 (hereinafter abbreviated to Y1 to Y3 electrodes), addressing electrodes A1 to A4, and barriers 2. The above sustain discharge electrodes are juxtaposed in parallel with each other on one substrate. The addressing electrodes are formed to cross the sustain discharge electrodes on the other substrate. The barriers 2 are arranged in parallel with the addressing electrodes, thus separating discharge spaces from each other. A discharge cell is formed in areas defined by the mutually adjoining sustain discharge electrodes and the addressing electrodes crossing the sustain discharge electrodes. Phosphors used to produce visible light are placed in the discharge cells. A gas for bringing about discharge is sealed in a space between the substrates. In this drawing, for brevity's sake, the sustain discharge electrodes are arranged parallel to each other in threes, and the addressing electrodes number four.

In the PDP having the foregoing structure, sustain discharge is induced in lines defined by each sustain discharge electrode and sustain discharge electrodes on both sides thereof. Interspaces or lines (L1 to L5) defined by all the electrodes therefore can work as display lines. For example, the X1 electrode and Y1 electrode define a display line L1, and the Y1 electrode and X2 electrode define a display line L2.

FIG. 2 shows a sectional view of the PDP shown in FIG. 1 along an addressing electrode. There are shown a front substrate 3, a back substrate 4, and discharges D1 to D3 induced in lines defined by electrodes. In practice, a voltage is applied to the Y1 electrode and X1 electrode. This induces the discharge D1. When a voltage is applied to the Y1 electrode and X2 electrode, the discharge D2 is induced. The discharge D3 is induced by applying a voltage to the X2 electrode and Y2 electrode. Thus, one electrode is utilized for providing display lines on both sides thereof. Consequently, a high-definition display can be achieved owing to a decreased number of electrodes. Besides, the number of drive circuits for driving the electrodes can be reduced accordingly.

FIG. 3 shows a frame configuration employed in the PDP shown in FIG. 1. One frame is composed of two fields of a first field and second field. During the first field, odd-numbered lines (L1, L3 and L5) are used as display lines to be involved in the display. During the second field, even-numbered lines (L2, L4) are used as display lines to be involved in the display. Thus, a picture for one screen is displayed during one frame. Each field consists of a plurality of sub-fields for which luminance levels are set in a predetermined ratio. Cells constituting display lines are selectively allowed to glow according to display data during the sub-fields. Thus, gray-scale levels construed as differences in luminance among pixels are expressed. Each sub-field consists of a reset period, an addressing period, and a sustain discharge period. During the reset period, the states of cells that are mutually different depending on the display situation over an immediately preceding sub-field are uniformed. During the addressing period, new display data is written. During the sustain discharge period, sustain discharge is induced in the cells constituting display lines so that the cells are allowed to glow according to display data.

FIG. 4 is a waveform diagram concerning a conventional driving method implemented in the PDP shown in FIG. 1. FIG. 4 is concerned with any sub-field within the first field.

During the reset period, a reset pulse of a voltage Vw exceeding a discharge start voltage is applied to all the X electrodes. Discharge is initiated in the lines defined by the X electrodes and adjoining Y electrodes. As a result, first discharge (reset discharge) is induced in all the lines (L1 to L5). Wall charges including positively-charged ions and electrons are produced in the discharge cells. Thereafter, the reset pulse is removed and the electrodes are retained at the same potential. Second discharge (self-erase discharge) is then induced due to the potential difference generated by the wall charges produced on the electrodes. At this time, since the electrodes are retained at the same potential, positively-charged ions and electrons stemming from discharge are recombined with each other within the discharge spaces. Consequently, the wall charges disappear. The magnitude of wall charges in all the display cells can be uniformed with the discharge (the distribution of wall charges is uniformed).

During the next addressing period, a scanning pulse of a voltage −Vy is applied successively to the electrodes starting with the Y1 electrode. An addressing pulse of a voltage Va is applied to the addressing electrodes according to display data. Consequently, addressing discharge is initiated. At this time, a pulse of a voltage Vx is applied to the X1 electrode to be paired with the Y1 electrode to participate in the display within the first field. Discharge having been induced in the spaces defined by the addressing electrodes and the Y1 electrode shifts to the line between the X1 electrode and Y1 electrode. Consequently, wall charges needed to initiate sustain discharge are produced near the X1 electrode and Y1 electrode. The potential at the X2 electrode to be paired with the Y1 electrode to define a line not involved in the display is retained at 0 V. It is therefore prevented that discharge is induced in the line defined by the X2 electrode. Likewise, addressing discharge is induced successively in the odd-numbered Y electrodes.

After the addressing discharge induced in the odd-numbered Y electrodes is completed, a scanning pulse is applied to the Y2 electrode. At this time, a pulse of a voltage Vx is applied to the X2 electrode to be paired with the Y2 electrode to thus participate in the display. The X3 electrode that is not shown is, like the X1 electrode, retained at 0 V. Likewise, addressing discharge is induced successively in the even-numbered Y electrodes. Consequently, addressing discharge is induced in the odd lines in the whole screen.

Thereafter, during the sustain discharge period, a sustain pulse of a voltage Vs is applied alternately to the X electrodes and Y electrodes. At this time, the phase of the sustain pulse is set so that a potential difference between paired electrodes defining a line not involved in display will be 0 V. It is thus prevented that discharge is induced in non-display lines. For example, sustain pulses that are mutually out of phase are applied to the pair of the X1 and Y1 electrodes participating in the display over the first field. In contrast, sustain pulses that are mutually in phase are applied to the pair of the Y1 and X2 electrodes defining a non-display line. Display is thus achieved over the first sub-field.

In FIG. 4, the voltage Vs is a voltage needed to induce sustain discharge and is usually set to about 170 V. Moreover, the voltage Vw is a voltage exceeding the discharge start voltage and set to about 350 V. The voltage −Vy of the scanning pulse is set to about −150 V, and the voltage Va of the addressing pulse is set to about 60 V. The sum of the absolute values of the voltages Va and Vy will be equal to or larger than the discharge start voltage with which discharge is initiated in the spaces defined by the addressing electrodes and each Y electrode. Moreover, the voltage Vx is set to about 50 V or a value causing discharge induced in the line defined by the addressing electrodes and each Y electrode to shift to the line defined by an X electrode. The value must enable production of sufficient wall charges.

However, according to the foregoing conventional driving method, reset discharge is adopted. The pulse of the voltage Vw exceeding the discharge start voltage, with which discharge is initiated in discharge cells, is applied to the X electrodes. This results in intense discharge. Light emission stemming from the discharge is background light emission having no relation to the display of a picture. This leads to a deterioration in the contrast of the picture.

Moreover, in the foregoing driving method using the lines defined by all the sustain discharge electrodes as display lines, there is a possibility that reset discharge may not be induced stably in all the discharge cells. In other words, the reset pulse is applied to all the X electrodes in order to induce discharge in all display lines. A discharge start time at which discharge is initiated in each discharge cell differs from discharge cell to discharge cell. There is a possibility that discharge may not be induced in some cells.

Referring back to FIG. 2, the X2 electrode will be discussed. If discharge D2 is induced first in the line between the X2 electrode and Y1 electrode, charges stemming from the discharge start to be accumulated near the electrodes. The wall charges generate a bias voltage of the opposite polarity to the voltage Vw and an effective voltage in the discharge space decreases. More particularly, wall charges are produced on the X2 electrode due to electrons. The wall charges cause the effective voltage of the voltage Vw applied to the X2 electrode in the discharge space to drop. The drop in the effective voltage may precede the initiation of discharge in the line between the X2 electrode and Y2 electrode. In this case, although discharge is not induced in the line between the x2 electrode and Y2 electrode, the reset period may come to an end. If reset discharge is not induced in some discharge cells, the states of the cells are not uniformed. Consequently, addressing discharge cannot be induced stably in the discharge cells. This leads to erroneous display.

Even if reset discharge is induced in all the cells, subsequent self-erase discharge may not be induced stably. The self-erase discharge is induced due to the potential difference generated by the wall charges stemming from reset discharge. The self-erase discharge may often be smaller in scale that the reset discharge. Depending on a difference in characteristics from discharge cell to discharge cell, the self-erase discharge may not be induced but wall charges stemming from the reset discharge may remain intact. Otherwise, when the reset discharge is completed, sufficient wall charges may not be produced and the self-erase discharge may not be induced. Consequently, subsequent addressing discharge is not induced normally in discharge cells that have not undergone erase discharge. This causes erroneous display.

As a method for solving the above problems, it is conceivable to raise the voltage of the reset pulse to induce discharge reliably in all cells. However, a further rise in discharge voltage will intensify the aforesaid background light emission and deteriorate the contrast of the picture.

If the reset period shifts to the addressing period with wall charges remaining intact in discharge cells because of the aforesaid cause, another problem arises. During the addressing period, as mentioned above, the voltage Vx is applied to X electrodes defining display lines. The other X electrodes defining non-display lines are held at 0 V, thus preventing the occurrence of addressing discharge. However, if unnecessary wall charges remain intact, discharge may be induced in the non-display lines.

For example, referring to FIG. 2, the scanning pulse of the voltage −Vy is applied to the Y1 electrode. The addressing pulse of the voltage Va is applied to the addressing electrodes, whereby addressing discharge is induced. At this time, since the voltage Vx is applied to the X1 electrode, the addressing discharge is succeeded by discharge to be induced in the line between the Y1 electrode and X1 electrode. Namely, discharge D1 is induced. At this time, the X2 electrode adjoining the Y1 electrode is held at 0 V. Induction of discharge D2 can be avoided in principle. However, the discharge D2 may be induced due to deflection of residual charges deriving from uncertainty of reset discharge. Consequently, wall charges of negative polarity are accumulated on the X2 electrode. Subsequent addressing discharge D3 is affected by the wall charges. Incidentally, there is a possibility that erroneous discharge caused by electrodes not participating in the display may also be caused by a difference in discharge start voltage from discharge cell to discharge cell.

Moreover, sustain discharge induced during each sub-field may spread depending on the sustain discharge voltage Vs or cell structure. Referring to FIG. 6, when sustain discharge is induced in the lines between the X1 and Y1 electrodes and between the X2 and Y2 electrodes, wall charges are accumulated over the electrodes Y1 and X2 to some extent. These wall charges are erased during the reset period within each sub-field. Wall charges formed on the addressing electrodes may not be erased but remain intact. The wall charges do not affect subsequent discharge to be induced within a field within which the lines between the X1 and Y1 electrodes and the X2 and Y2 electrodes are involved in display. The wall charges destabilize addressing discharge to be induced within the next field within which the line between the Y1 and X2 electrodes is involved in the display.

SUMMARY OF THE INVENTION

The present invention attempts to solve the above problems. An object of the present invention is to provide a method for driving a plasma display panel in which reset discharge and erase discharge can be induced reliably without deterioration in the contrast of the picture, and addressing discharge can be induced stably.

For accomplishing the above object, according to the present invention, there is provided a method for driving a plasma display panel. In the plasma display panel, pluralities of first electrodes and second electrodes are arranged parallel to each other, and a plurality of third electrodes are arranged to cross the first and second electrodes. Moreover, discharge cells defined by areas in which the electrodes cross mutually are arranged in the form of a matrix. According to the driving method, during a reset period, the distribution of wall charges in the plurality of discharge cells are uniformed. During an addressing period, wall charges are produced in discharge cells according to display data. During a sustain discharge period, sustain discharge is induced in the discharge cells in which the wall charges are produced during the addressing period. The driving method comprises an operation of applying a first pulse in which an applied voltage varies with time so as to induce first discharge in the lines defined by the first and second electrodes, and an operation of applying a second pulse in which an applied voltage varies with time so as to induce second discharge as erase discharge in the lines defined by the first and second electrodes. Herein, these steps are carried out during the reset period.

According to the above driving method, a quite feeble discharge can be induced as reset discharge. An amount of light emission is limited. Despite the reset discharge, the contrast of the picture does not deteriorate remarkably. Subsequent erase discharge is not self-erase discharge but is induced by applying a pulse in which an applied voltage varies with time. The erase discharge can be induced irrespective of a difference in characteristics from discharge cell to discharge cell or the magnitude of residual wall charges. Moreover, since the discharge is feeble, the amount of glow is limited and the contrast of the picture does not deteriorate remarkably.

The above-mentioned effects of the present invention can be exerted even when the present invention is adapted to any conventional PDP in which each pair of sustain discharge electrodes provides one display line. Namely, the present invention is not limited to a PDP in which, as described mainly in the present specification, the lines defined by all electrodes are involved in the display.

BRIEF DESCRIPTION OF THE DRAWINGS

The above object and features of the present invention will be more apparent from the following description of the preferred embodiment with reference to the accompanying drawings, wherein.

DETAILED DESCRIPTION OF THE PREFERRED EMBODIMENTS

Preferred embodiments of the present invention will be described with reference to the appended drawings (FIG. 5 to FIG. 13).

Figure 5:
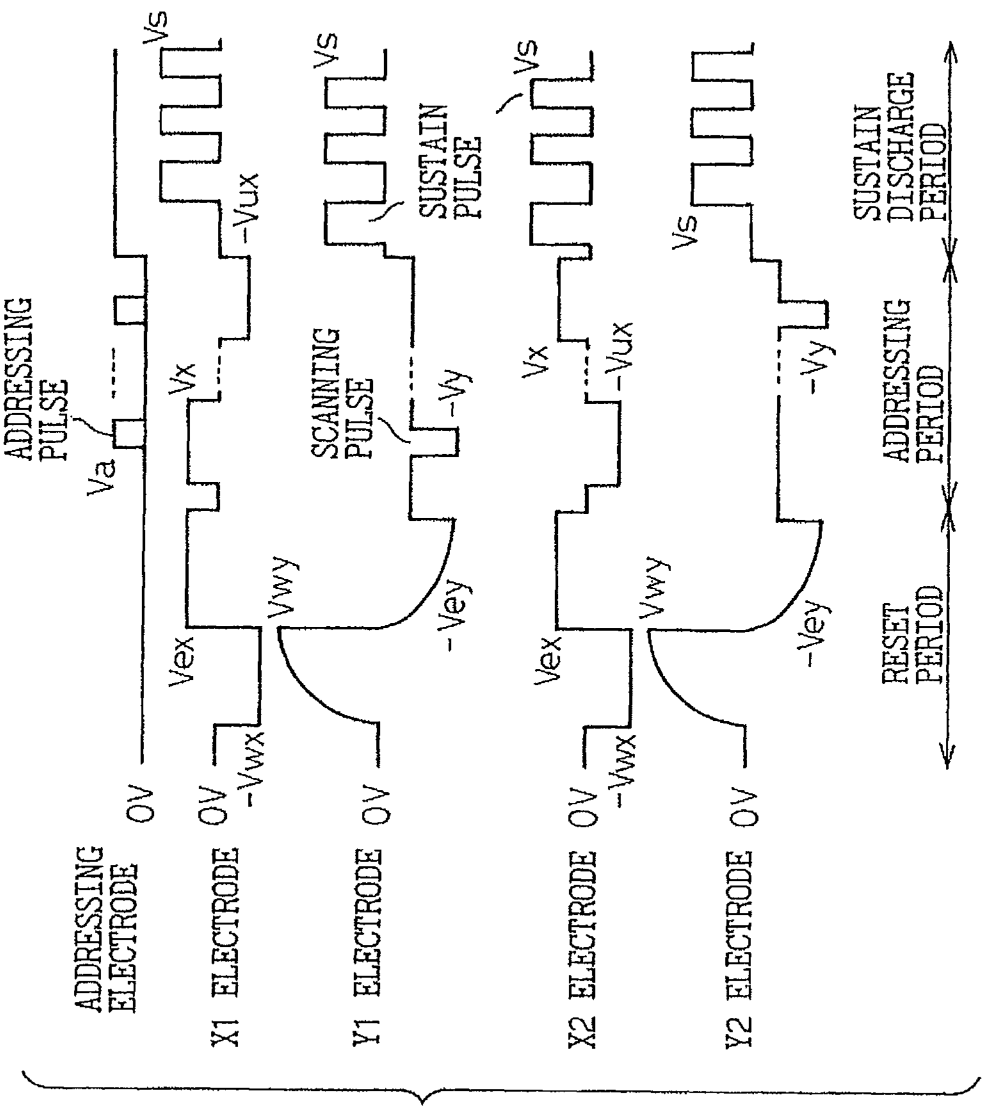
FIG. 5 is a waveform diagram concerning a first embodiment of the present invention.

FIG. 5 is a waveform diagram concerning a first embodiment of the present invention. In FIG. 5, there are shown the waveforms of voltages to be applied to addressing electrodes, an X1 electrode, a Y1 electrode, an X2 electrode, and a Y2 electrode during a sub-field within a first field. Odd lines are involved in display within the first field. The sub-field consists of a reset period, an addressing period, and a sustain discharge period. Hereinafter, the X1 and X2 electrodes shall be referred to as X electrodes, the Y1 and Y2 electrodes shall be referred to as Y electrodes, and all of them shall be referred to as sustain discharge electrodes.

During the reset period, the addressing electrodes are set to 0 V, and pulses of positive and negative polarities are applied to the sustain discharge electrodes. Specifically, a pulse of a voltage −Vwx is applied to the X electrodes, and a pulse of a voltage Vwy is applied to the Y electrodes. The pulse to be applied to the Y electrodes is a slope pulse that reaches the voltage Vwy whose voltage variation per unit time changes in magnitude. Consequently, a first feeble discharge is induced in the lines defined by the X electrodes and Y electrodes.

When a rectangular wave Vw similar to a conventional one is applied as an applied voltage, intense discharge is induced proportional to a difference Vw−Vf from a discharge start voltage Vf to be applied to initialize discharge in discharge cells. Excess wall charges are produced to affect adjoining discharge cells. However, since a slope pulse is adopted, when the applied voltage exceeds the discharge start voltage Vf to be applied to each discharge cell, each discharge cell starts discharging. The induced discharge is merely feeble. The magnitude of produced wall charges is small. Consequently, even if reset discharge is induced earlier in a certain discharge cell, the reset discharge will not affect adjoining discharge cells. Moreover, since the discharge is feeble, background glow is weak.

Thereafter, a pulse of a voltage Vex is applied to the X electrodes, and a pulse of a voltage −Vey is applied to the Y electrodes. The pulse applied to the Y electrodes is a slope pulse that reaches a voltage −Vey while changing in magnitude its voltage variation per unit time. This induces second discharge, whereby wall charges stemming from the immediately preceding discharge are erased.

When self-erase discharge is employed as it is conventionally, discharge may not be induced depending on the magnitude of wall charges produced or the characteristic of discharge cells. According to the present invention, discharge is forcibly induced by applying a voltage Vex+Vey. Erase discharge is therefore induced reliably. Furthermore, since an applied pulse is a slope pulse, discharge is feeble. The contrast of the picture will not deteriorate. Moreover, the voltage Vex+Vey is set to be slightly lower than the discharge start voltage Vf. Wall charges of diminutive magnitude stemming from the first discharge are superimposed on the voltage, whereby erase discharge is induced.

Sustain discharge is induced fundamentally in the lines defined by the X and Y electrodes. Meanwhile, the addressing electrodes are retained at a potential lower than a sustain discharge voltage Vs. Wall charge of positive polarity are therefore produced on the addressing electrodes. For the first discharge in this embodiment, the pulse of negative polarity is applied to the X electrodes. Discharge is induced in the spaces defined by the addressing electrodes and X electrodes, and released charges are superimposed on the wall charges remaining on the addressing electrodes. Consequently, the wall charges remaining on the addressing electrodes above the X electrodes are erased. For the subsequent second discharge, the pulse of negative polarity is applied to the Y electrodes. Wall charges remaining on the addressing electrodes above the Y electrodes are erased.

Thereafter, during the addressing period, addressing discharge is induced by applying a scanning pulse successively to the Y electrodes. A voltage Vx is, conventionally, applied to X electrodes that are paired with the Y electrodes, to which the scanning pulse has been applied, to define display lines. Consequently, addressing discharge is induced. In contrast, a voltage −Vux is applied to X electrodes defining non-display lines. A potential difference from the Y electrodes is thus limited in order to prevent addressing discharge from being induced in the non-display lines. The scanning pulse is applied successively to the odd-numbered Y electrodes in order to induce addressing discharge. Thereafter, the scanning pulse is applied successively to the even-numbered Y electrodes in order to induce addressing discharge. This procedure is the same as that in the conventional method.

After the addressing period elapses, the sustain discharge period starts. A sustain pulse is applied alternately to the X electrodes and Y electrodes. Sustain discharge is induced repeatedly in cells having undergone addressing discharge during the addressing period. At this time, the phase of the sustain discharge pulse is determined as it conventionally is, so that sustain discharge will not be induced in non-display lines.

Referring to FIG. 5, the sum of the absolute values of the voltages −Vwx and Vwy to be applied during the reset period is set to a value exceeding the value of a discharge start voltage. The discharge start voltage is a voltage with which discharge is initiated in the lines defined by X and Y electrodes. For example, the voltage −Vwx is set to −130 V, and the voltage Vwy is set to 220 V. For the subsequent erase discharge, for example, the voltage Vex is set to 60 V, and the voltage −Vey is set to −160 V. Moreover, for the addressing period, the voltage Va is set to, for example, 60 V, the voltage −Vy of the scanning pulse is set to, for example, −150 V. The voltage Vx to be applied to the X electrodes is set to, for example, 50 V, and the voltage −Vux is set to, for example, −80 V. Moreover, the voltage Vs of the sustain pulse is set to, for example, 170 V. Moreover, the voltages Vex and Vx or −Vey and −Vy may be set to the same voltage. In this case, a circuit can be used in common, and the scale of circuitry can be suppressed.

Figure 1:
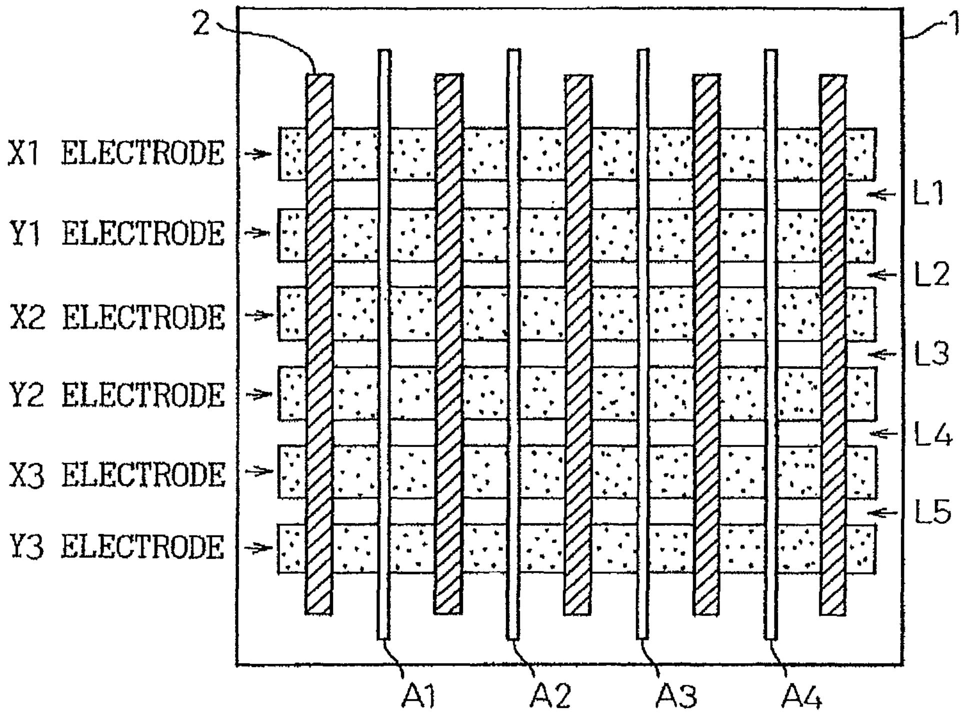
FIG. 1 schematically shows the structure of a surface discharge type PDP.
Figure 2:
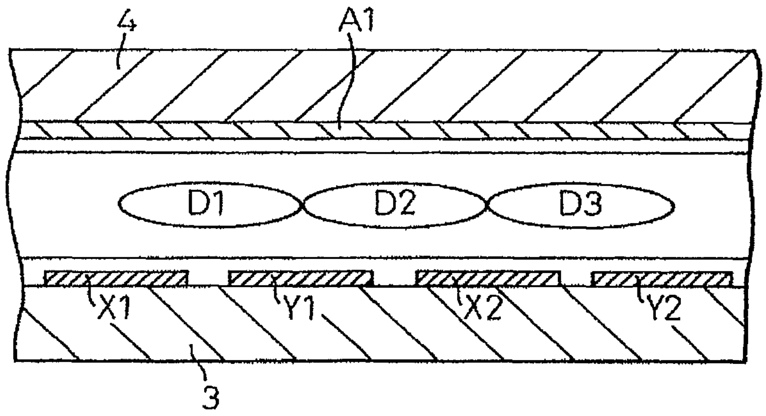
FIG. 2 is a sectional view of the PDP shown in FIG. 1 along an A1 addressing electrode.
Figure 3:
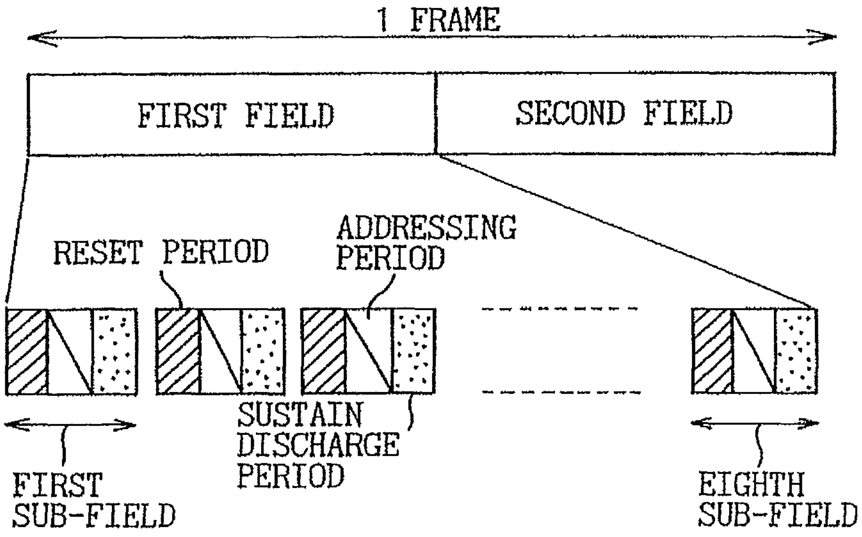
FIG. 3 shows a frame configuration employed in the PDP shown in FIG. 1.
Figure 4:
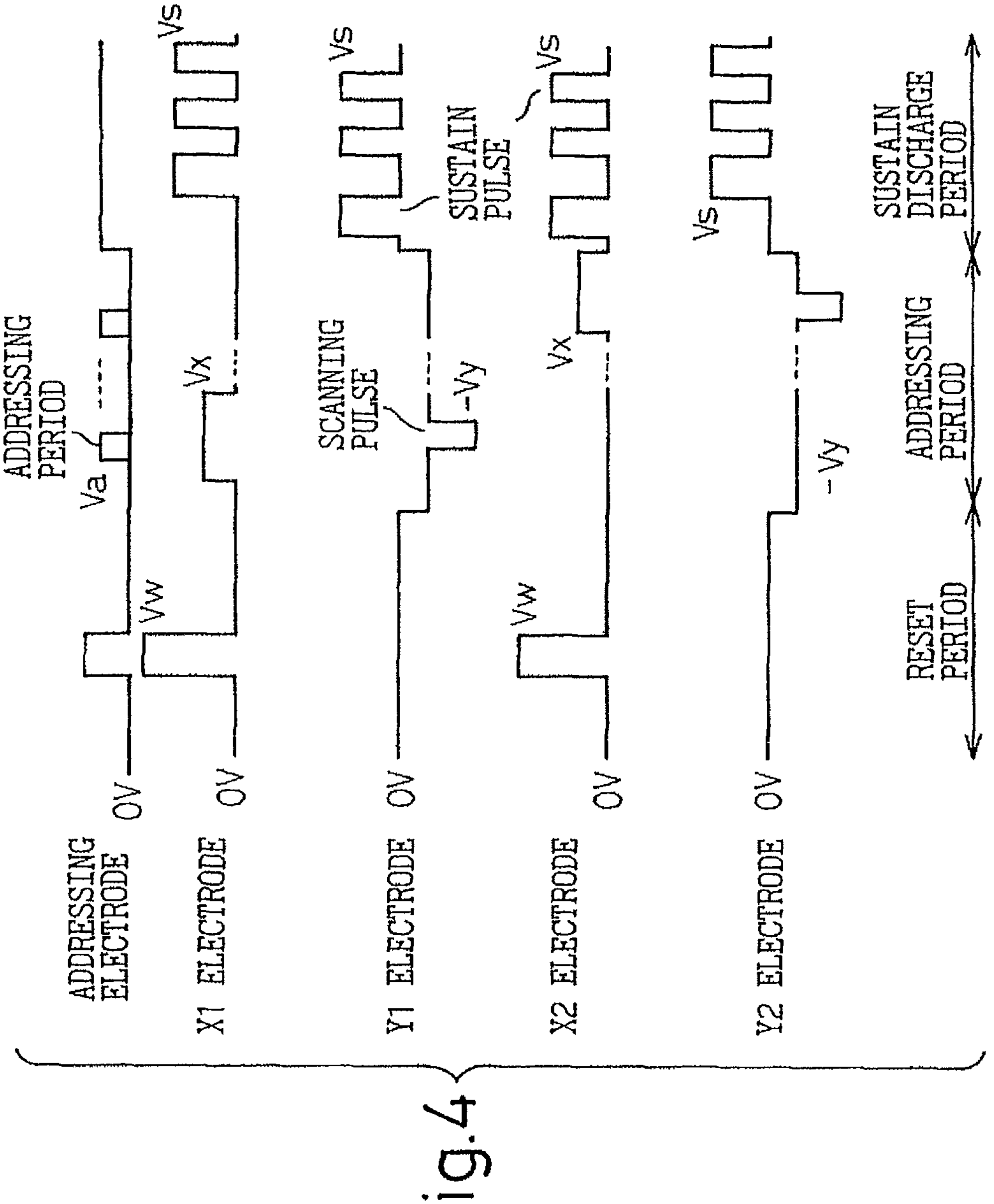
FIG. 4 is a waveform diagram concerning a conventional driving method implemented in the PDP shown in FIG. 1.
Figure 6:
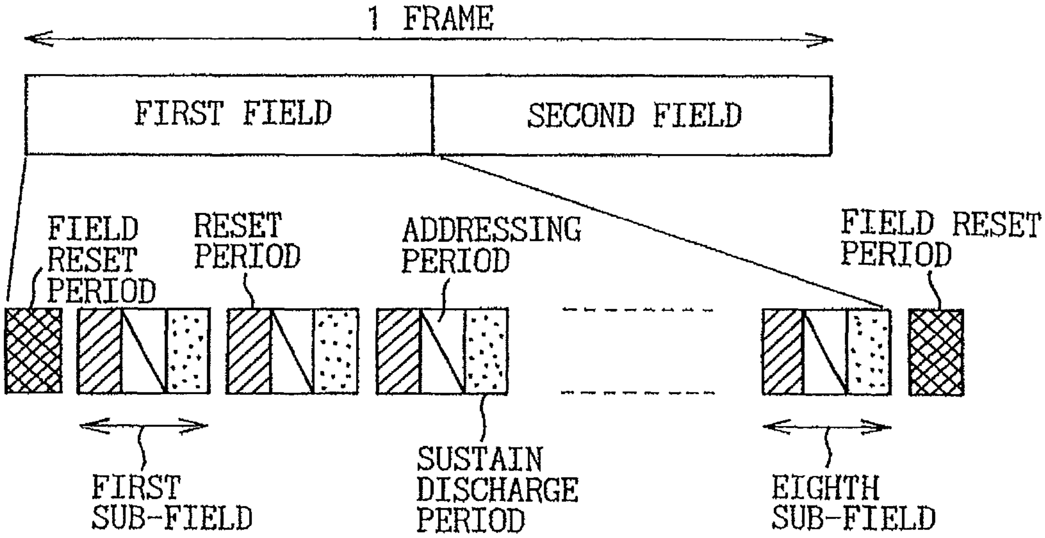
FIG. 6 shows a frame configuration employed in the first embodiment of the present invention.

FIG. 6 shows a frame configuration employed in the first embodiment of the present invention. A difference from the one shown in FIG. 3 lies in a point that a field reset period is defined at the start of each field. The field reset period is a period during which wall charges remaining on the addressing electrodes are erased at the time of a field-to-field transition.

Figure 7:
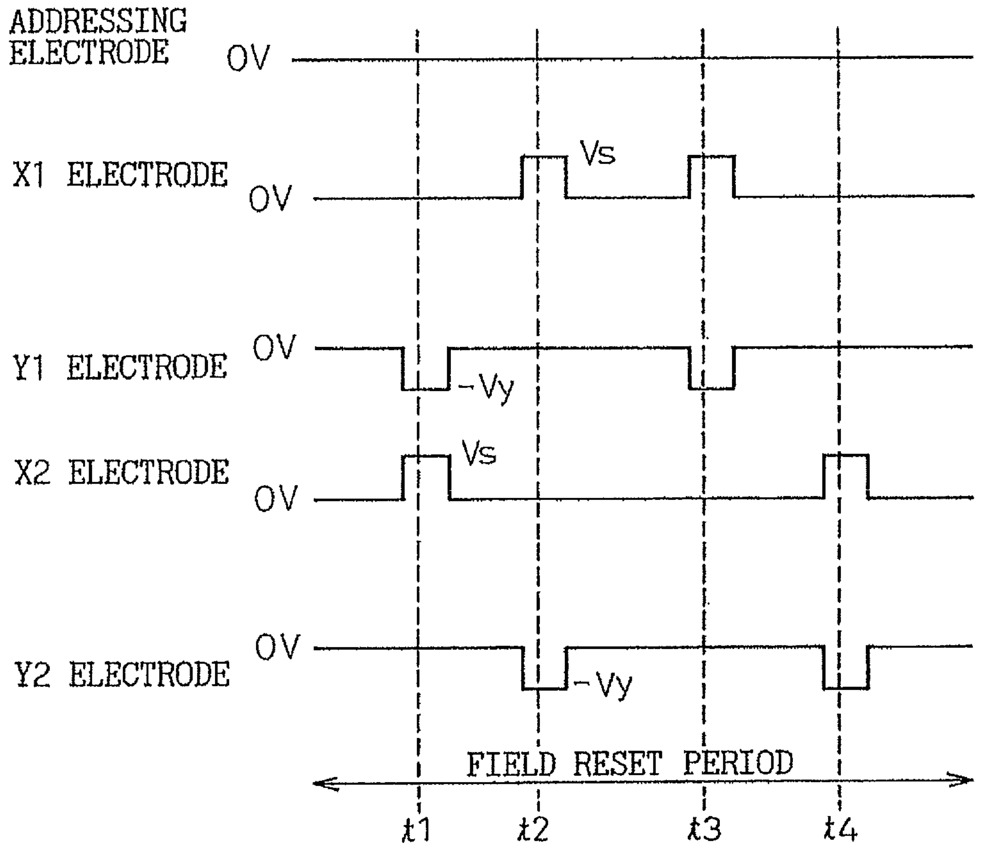
FIG. 7 is a waveform diagram concerning field reset employed in the first embodiment of the present invention.

FIG. 7 is a waveform diagram concerning field reset employed in the first embodiment of the present invention. At a time instant t1, a voltage −Vy is applied to the Y electrodes, and a voltage Vs is applied to the X2 electrodes. Consequently, discharge is induced and wall charges are produced. Thereafter, the pulses are removed and the potentials at the electrodes are held at the same value. Self-erase discharge is induced due to potential differences among the produced wall charges, whereby the wall charges are erased. Similarly, reset discharge is induced sequentially in all the lines defined by the electrodes at four times starting with a time instant t2 and ending with a time instant t4. Wall charges are reliably erased. In this embodiment, discharge is induced in the lines defined by the odd-numbered Y electrodes and even-numbered X electrodes at the time instant t1. Discharge is induced in the lines defined by the odd-numbered X electrodes and even-numbered Y electrodes at the time instant t2. Discharge is induced in the lines defined by the odd-numbered X electrodes and odd-numbered Y electrodes at the time instant t3. Discharge is induced in the lines defined by the even-numbered X electrodes and even-numbered Y electrodes at the time instant t4. It can be determined arbitrarily as to in which lines discharge is induced at the time instants t1 to t4.

In the aforesaid first embodiment, a pulse to be applied to the Y electrodes for first and second discharge is a slope pulse whose voltage variation per unit time changes in magnitude. The pulsating wave can be produced readily by constructing an RC circuit that consists of resistors R connected to a switching device for outputting a pulse and electrostatic capacitors C created among electrodes. A curve plotted by tracing the slope pulse is determined by the time constant defined by the RC circuit.

However, when the slope pulse is employed, the voltage variation of the pulse per unit time changes in magnitude with the rise or fall of the pulse. This causes a problem in that the intensity of discharge varies depending on at what time instant discharge is initiated. When the pulse is saturated to approximate a set voltage, if discharge is initiated, very feeble discharge can be realized. However, discharge may be initiated in a relatively early stage because of a difference in characteristics from discharge cell to discharge cell, that is, discharge may be initiated at the relatively sharp leading or trailing edge of the pulse. In this case, intense discharge may be induced, and wall charges of great magnitude may be produced.

Figure 8:
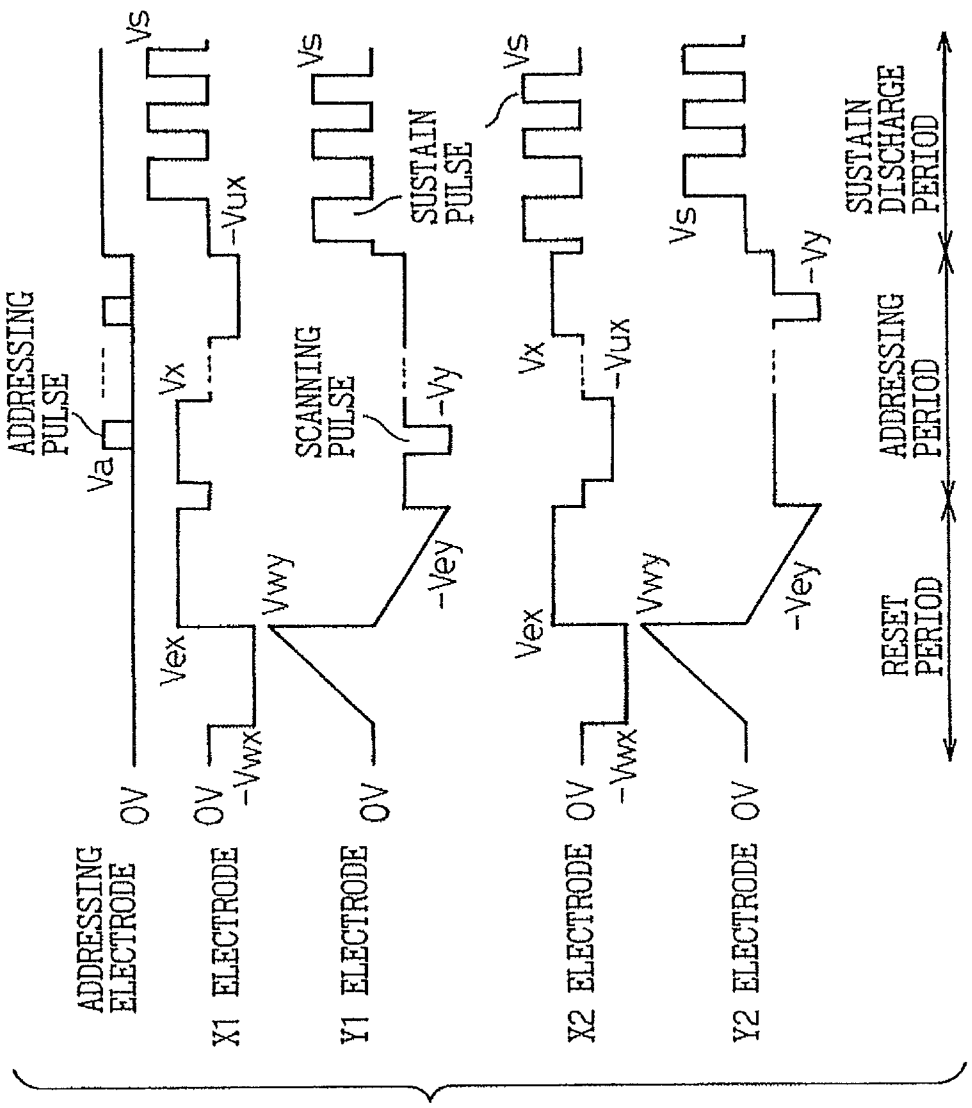
FIG. 8 is a waveform diagram concerning a second embodiment of the present invention.

FIG. 8 is a waveform diagram concerning the second embodiment of the present invention. This embodiment is such that a pulse to be applied to the Y electrodes for the first and second discharge is a triangular wave whose voltage variation per unit time is constant in magnitude. According to this embodiment, the circuitry for producing the triangular wave is somewhat more complex than that in the first embodiment. However, since the slope of the pulse is constant, feeble discharge can be induced reliably.

Figure 9:
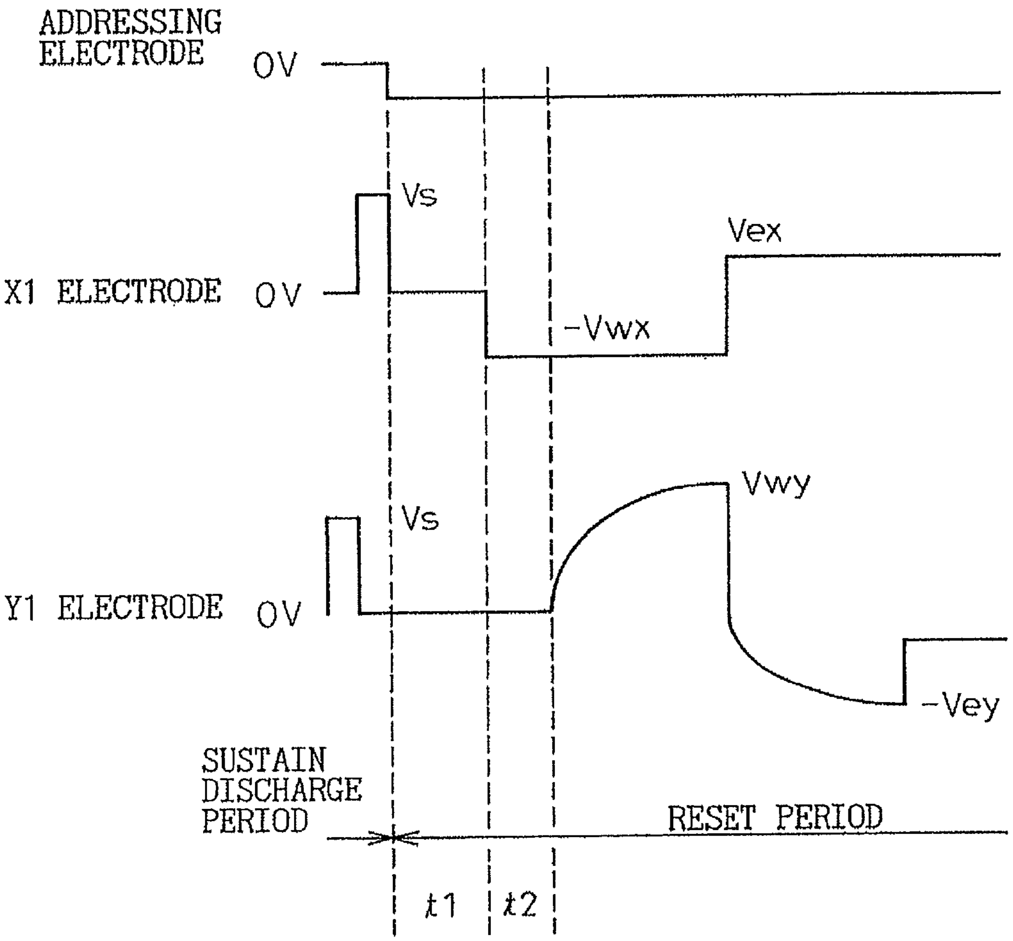
FIG. 9 is a waveform diagram concerning a third embodiment of the present invention.

FIG. 9 is a waveform diagram concerning the third embodiment of the present invention. FIG. 9 is concerned with a time instant during a sustain discharge period within a sub-field, at which the last pulse is applied, and a reset period within the next sub-field. In this embodiment, a slope pulse whose voltage variation per unit time changes in magnitude is adopted as a pulse to be applied to the Y electrodes for the first and second discharge. From this viewpoint, the third embodiment is identical to the first embodiment. However, in this embodiment, it is designed that sufficient time has elapsed from the leading edge of the sustain discharge pulse to be applied during the sustain discharge period within the sub-field, to the application of a pulse during the reset period within the next sub-field.

When sustain discharge is induced with application of the sustain pulse, wall charges of predetermined magnitude are accumulated with the completion of discharge. When a certain time has elapsed since the completion of discharge, produced wall charges start neutralizing spatial charges existent in discharge spaces. After sufficient time has passed since the application of the last sustain pulse, reset discharge is induced. In this way, wall charges remaining at the end of the sustain discharge period can be erased to some extent. Consequently, the subsequent reset discharge can be induced with fewer residual wall charges. The reset discharge can therefore be induced stably. The time from the trailing edge of the sustain discharge pulse to the initiation of the next reset discharge, t1, should be longer than at least 1 μs, or preferably, should be 10 μs.

Moreover, in this embodiment, for the first discharge to be induced during the reset period, a pulse of negative polarity is applied to the X electrodes and a pulse of positive polarity is applied to the Y electrodes. At this time, the timing of applying the pulse of negative polarity is different from that of applying the pulse of positive polarity.

As mentioned in relation to the first embodiment, a pulse of negative polarity and a pulse of positive polarity are applied to the X electrodes and Y electrodes respectively at the same time. In this case, although a slope pulse is employed, intense discharge may be induced. In this embodiment, the timing of applying a pulse of negative polarity to the X electrodes is differentiated from the one of applying a pulse of negative polarity to the Y electrodes.

As mentioned above, a pulse of negative polarity to be applied to the X electrodes for first discharge exerts the effect of erasing wall charges remaining on the addressing electrodes. When the erase discharge is induced earlier, wall charges of positive polarity are produced on the X electrodes, to which the pulse of negative polarity has been applied, along with the erasure of wall charges on the addressing electrodes. If a second pulse of positive polarity is applied to the Y electrodes in this state, an effective voltage in the lines defined by the X and Y electrodes drops to prevent intense discharge. For merely preventing intense discharge, the voltage of negative polarity to be applied to the X electrodes is lowered according to a method. In this case, it becomes difficult to induce erase discharge in the spaces below the addressing electrodes. This is not preferable.

A delay time t2 from the application of a pulse to the X electrodes to application of a pulse to the Y electrodes should be at least about 5 μs.

Figure 10:
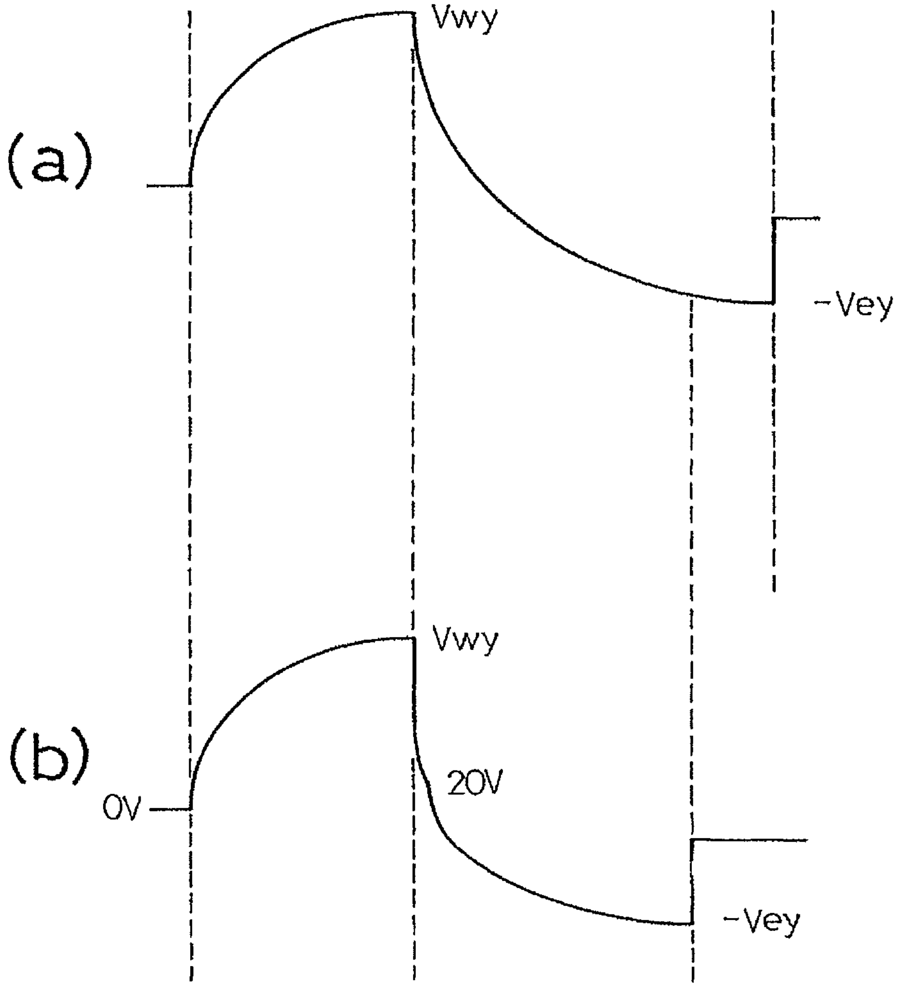
FIG. 10 is a waveform diagram concerning a fourth embodiment of the present invention.

FIG. 10 is a waveform diagram concerning the fourth embodiment of the present invention, wherein only the waveform of a voltage to be applied to the Y electrodes during the reset period is illustrated. A pulse to be applied to the Y electrodes is a slope pulse whose voltage variation per unit time changes in magnitude.

In the aforesaid first to third embodiments, the potential at the Y electrodes which has reached Vwy is lowered to 0 V at the time of second discharge succeeding first discharge. Thereafter, a pulse for inducing the second discharge is applied. However, when the potential at the Y electrodes is lowered to 0 V, if high voltages are concurrently applied to the electrodes, intense discharge may be induced. When the application of a pulse of positive polarity to the X electrodes and the application of a pulse of negative polarity to the Y electrodes are concurrently carried out for the second discharge, it means that the high voltages are concurrently applied to the electrodes.

According to this embodiment, in the case of a portion "a" of FIG. 10, the potential at the Y electrodes is not lowered to 0 V but the pulse for inducing the second discharge is applied immediately. This can prevent concurrent application of high voltages to the electrodes. Consequently, intense discharge can be avoided.

However, the case of the portion "a" of FIG. 10 poses a problem in that the time required for the second discharge gets longer. This is because the potential at the Y electrodes is dropped from Vwy to −Vey using a slope pulse. For shortening the time required for the second discharge, a voltage variation per unit time must be increased in magnitude. Consequently, the scale of the second discharge expands and the contrast of the picture deteriorates.

The case of a portion "b" of FIG. 10 stands in the middle of the first to third embodiments and the case of the portion "a" of FIG. 10. Namely, the potential at the Y electrodes that has reached Vwy is lowered to a potential higher than 0 V (for example, about 20 V). Thereafter, a pulse of negative polarity that is a slope pulse is applied.

For example, the potential at the Y electrodes that has reached Vwy is lowered to Vs by connecting the Y electrodes to a power supply Vs for sustain discharge. Furthermore, a power collection circuit connected to the Y electrodes is used to lower the potential at the Y electrodes to a predetermined value. This technique is readily adopted. The power collection circuit is realized with a series resonant circuit composed of an inductor connected to the Y electrodes (or X electrodes) and a panel capacitor. The power collection circuit collects and reuses the sustain voltage Vs applied to the electrodes. During the sustain discharge period, the sustain voltage Vs is applied alternately to the X and Y electrodes. This action is equivalent to charging and discharging of the panel capacitor realized with the lines defined by the X and Y electrodes. The power collection circuit effectively utilizes the charging current and discharging current. The power collection circuit is indispensable to low power consumption to be attained in a PDP. By utilizing the power collection circuit, the potential at the Y electrodes can be lowered without addition of a new circuit.

After the potential at the Y electrodes is lowered to a predetermined value, the Y electrodes are connected to a conventional circuit for generating a slope erase pulse. Consequently, in this case, neither intense discharge will be induced nor the magnitude of a voltage variation per unit time will be increased. Nevertheless, the time required for the second discharge can be shortened.

Figure 11:
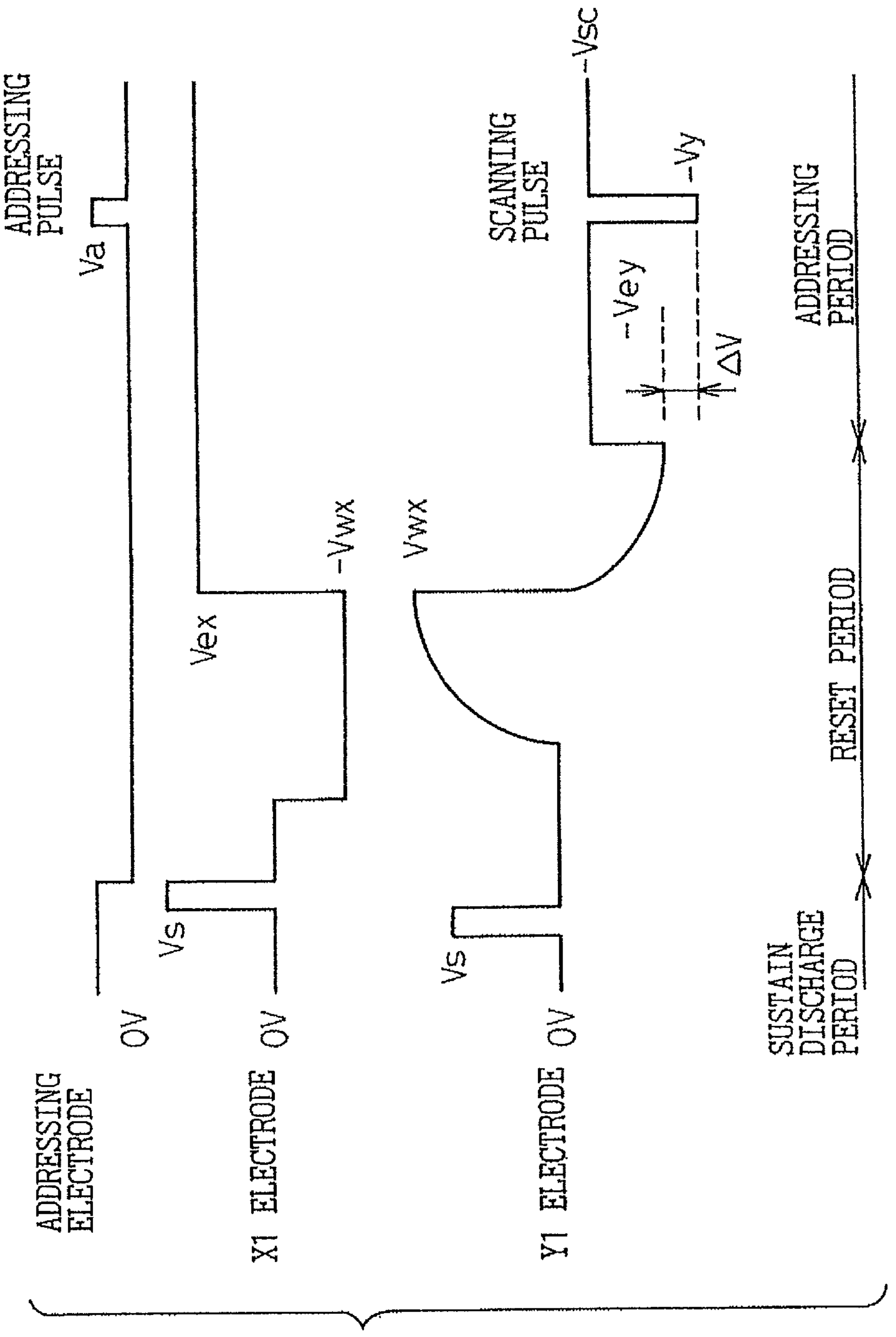
FIG. 11 is a waveform diagram concerning a fifth embodiment of the present invention.

FIG. 11 is a waveform diagram concerning the fifth embodiment of the present invention. In this embodiment, when the second discharge is completed, the potential at the Y electrodes reaches a potential higher than −Vy that is the voltage of the scanning pulse.

A slope pulse which is to be applied to the Y electrodes for the second discharge has a negative polarity. Positive wall charges are therefore produced on the Y electrodes. In the aforesaid first to fourth embodiments, the potential at the Y electrodes is lowered to −Vy that is the voltage of the scanning pulse. Produced wall charges are of relatively great magnitude. During the subsequent addressing period, the scanning pulse of negative polarity is applied to the Y electrodes. At this time, if positive wall charges remain intact, the effective voltage of the scanning pulse is lowered. This leads to a possibility of hindering stable induction of addressing discharge. In contrast, the potential at the Y electrodes may be too high at the completion of the second discharge (for example, the unselected potential −Vsc at Y electrodes during the addressing period). In this case, negative wall charges are produced on the Y electrodes. Consequently, when the scanning pulse of negative polarity is applied to the Y electrodes, the negative wall charges are superimposed on the scanning pulse. Eventually, there arises a possibility that discharge may be induced in cells in which the addressing pulse has not been applied.

In this embodiment, the potential at the Y electrodes attained at the completion of the second discharge is an intermediate one between the selected potential −Vy at Y electrodes during the addressing period and the unselected potential −Vsc at Y electrodes. Addressing discharge can therefore be induced stably. Otherwise, for ensuring the same margin for driving as a conventionally ensured one, the applied voltage of the addressing pulse may be lowered. The potential at the Y electrodes to be attained should be set so that a rise $\Delta V$ from the selected potential −Vy at Y electrodes during the addressing period will fall within a range of $0<\Delta V<20$ V, or preferably, will be approximately 10 V.

Figure 12:
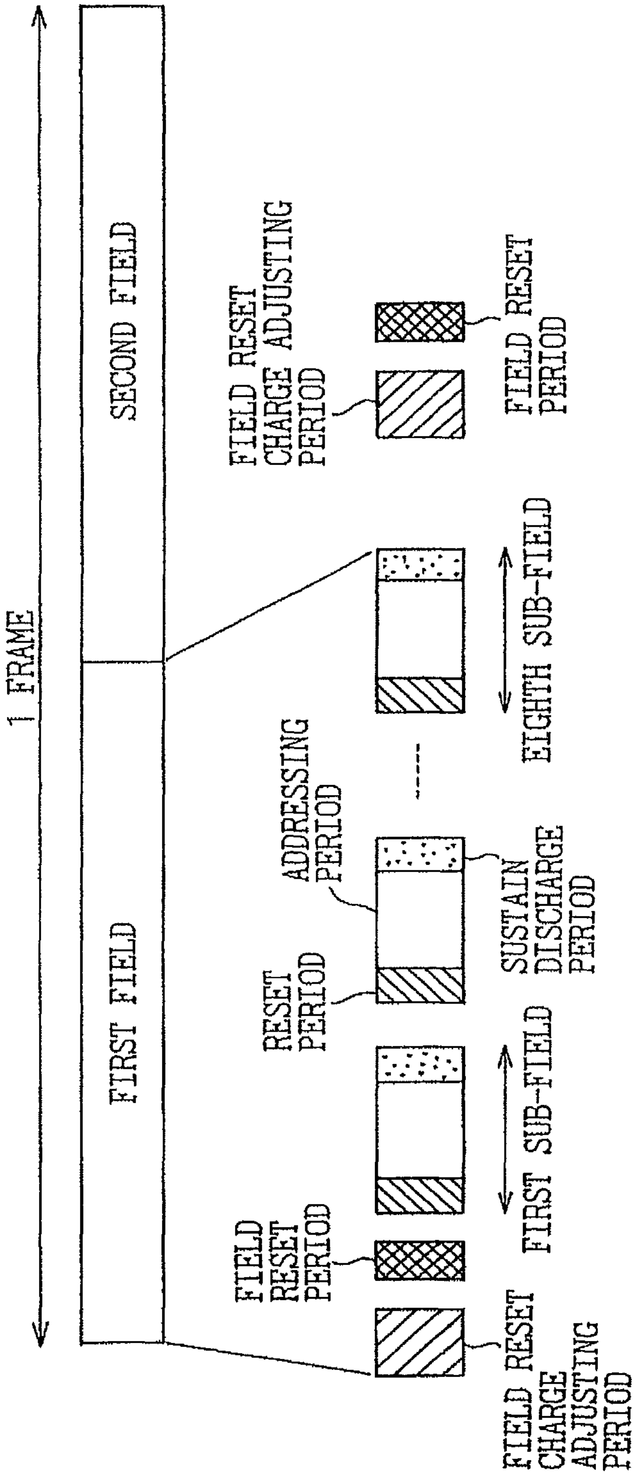
FIG. 12 shows a frame configuration employed in a sixth embodiment of the present invention.
Figure 13:
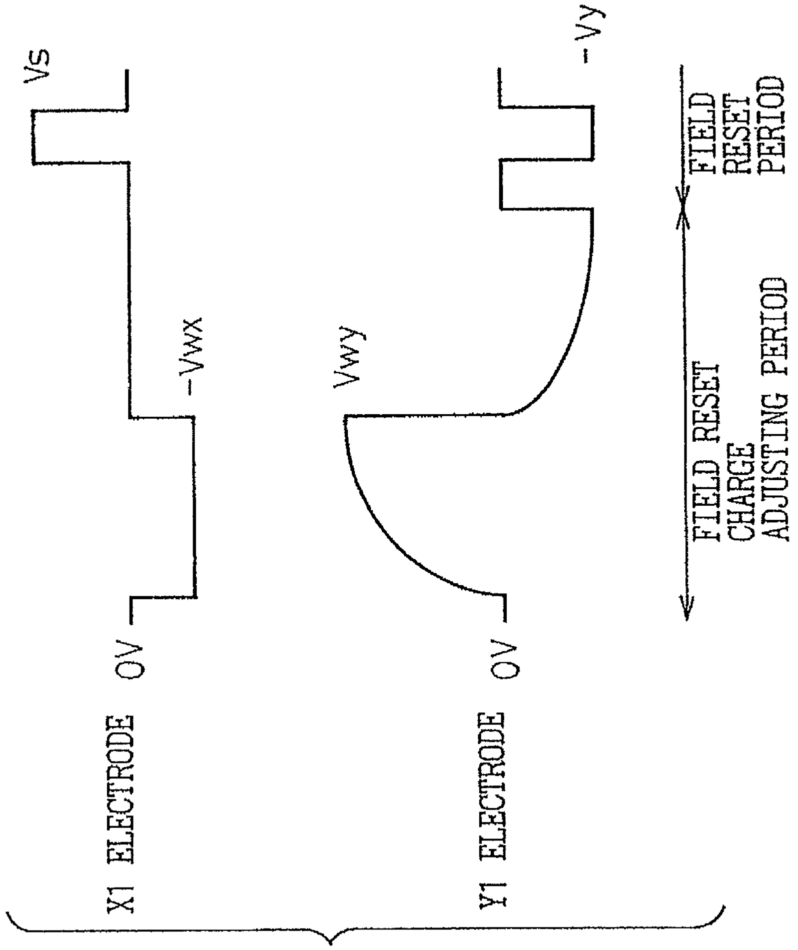
FIG. 13 is a waveform diagram concerning the sixth embodiment of the present invention.

FIG. 12 shows a frame configuration employed in the sixth embodiment of the present invention. FIG. 13 is a waveform diagram concerning the sixth embodiment. The sixth embodiment is identical to the first embodiment in a point that the field reset period described in conjunction with FIG. 6 is adopted. The sixth embodiment is characterized in that a field reset charge adjustment period (i.e., field reset charge adjusting period) is adopted.

After the first field or second field elapses, the states of charges in the cells are mutually different. This is because the discharged states of the cells attained within each field are mutually different. If wall charges whose polarity is opposite to that of an applied pulse used to carry out field reset remain intact at the start of the field reset period, the effective voltage of the applied pulse is lowered. This makes it difficult to carry out field reset stably. For example, in the example of FIG. 7, if positive wall charges remain intact on the Y1 electrode (or negative wall charges remain intact on the X2 electrode), effective voltages to be applied to the Y1 and X2 electrodes are lowered. This disables stable discharge. In this embodiment, the field reset period is preceded by the field reset charge adjustment period. Wall charges whose polarity is the same as that of a pulse to be applied during the field reset period are produced actively.

FIG. 13 is a practical waveform diagram. During the field reset charge adjustment period, first, a pulse of negative polarity is applied to the X1 electrode, and a pulse of positive polarity is applied to the Y1 electrode. The sum of the voltage Vwx applied to the X1 electrode and the voltage Vwy applied to the Y1 electrode exceeds a discharge start voltage with which discharge is initiated in each cell. Consequently, discharge is initiated in all the cells. At this time, the pulse to be applied to the Y1 electrode is a slope pulse whose voltage variation per unit time changes in magnitude. The discharge is therefore, similarly to the first discharge induced during the reset period, a feeble discharge. A deterioration in the contrast of the picture can therefore be suppressed. The whole-surface discharge causes negative wall charges to be accumulated on the Y1 electrode. However, the accumulated wall charges are of great magnitude. If the field reset charge adjustment period is shifted to the field reset period in this state, discharge becomes too large in scale due to superimposition of wall charges. An erase pulse of negative polarity is therefore applied to the Y1 electrode, whereby the magnitude of accumulated wall charges is adjusted. The pulse of negative polarity is a slope pulse whose voltage variation per unit time changes in magnitude.

Consequently, negative wall charges of proper magnitude are accumulated at the end of the field reset charge adjustment period. When the field reset charge adjustment period is shifted to the field reset period in this state, the produced wall charges are superimposed on an applied pulse. Field reset can be carried out reliably.

In summary, the method for driving a plasma display panel according to one aspect of typical embodiments described above of the present invention is such that the first pulse of positive polarity is applied to the second electrodes, and a pulse of negative polarity is applied to the first electrodes. Thereafter, the second pulse of negative polarity is applied to the second electrodes, and a pulse of positive polarity is applied to the first electrodes.

According to the above driving method, the second pulse is applied to be superimposed on wall charges stemming from first discharge. Erase discharge can be induced reliably by utilizing the voltages of the wall charges. Moreover, the pulse of negative polarity is applied to the first electrodes for inducing the first discharge, or the second pulse of negative polarity is applied to the second electrodes for inducing second discharge. Wall charges remaining on the addressing electrodes at the completion of sustain discharge within a previous subfield can be erased successfully.

Preferably, the method for driving a plasma display panel is such that the pulse to be applied for inducing first discharge is applied when a period longer than at least 1 μs has elapsed since the end of the sustain discharge period.

According to the above driving method, residual wall charges can be diminished prior to reset discharge.

Further, preferably, the method for driving a plasma display panel is such that, for inducing first discharge, the pulse of negative polarity is applied to the first electrodes before the first pulse of positive polarity is applied to the second electrodes.

According to the above driving method, wall charges remaining on the addressing electrodes can be erased, and it can be prevented that first discharge becomes intense.

Further, preferably, the method for driving a plasma display panel is such that each of the first and second pulses in which an applied voltage varies with time is a slope pulse whose voltage variation per unit time changes in magnitude.

According to the above driving method, there is a possibility that when a discharge start time differs with the state of a discharge cell, the intensity of discharge may vary. However, the method can be implemented with relatively simple circuitry.

Further, preferably, the method for driving a plasma display panel is such that each of the first and second pulses in which an applied voltage varies with time is a triangular wave whose voltage variation per unit time is constant.

According to the above driving method, although the circuitry is somewhat complex, feeble discharge can be induced reliably in all the discharge cells.

Further, preferably, the method for driving a plasma display panel is such that when the second pulse is applied, the potential at electrodes having reached a first potential with application of the first pulse is not lowered to a second potential that is the potential at the electrodes attained prior to the application of the first pulse.

According to the above driving method, it can be prevented that the second discharge becomes intense.

Further, preferably, the method for driving a plasma display panel is such that the potential at electrodes having reached the first potential with the application of the first pulse is lowered to a third potential higher than the second potential, and then the second pulse is applied.

According to the above driving method, the second discharge does not require a long time. Besides, it can be prevented that the second discharge becomes intense.

Further, preferably, the method for driving a plasma display panel is such that the potential at electrodes to be reached with application of the second pulse is higher than the selected potential at the second electrodes during the addressing period and lower than the unselected potential at the second electrodes during the addressing period.

According to the above driving method, wall charges of proper magnitude can remain intact prior to addressing discharge.

According to another aspect of typical embodiments described above of the present invention, there is provided the method for driving a plasma display panel. In the plasma display panel, pluralities of first electrodes and second electrodes are arranged parallel to each other, and a plurality of third electrodes are arranged to cross the first and second electrodes. Discharge cells defined with areas in which the electrodes cross mutually are arranged in the form of a matrix. According to the driving method, a first field and second field are temporally separated from each other. Within the first field, discharge is induced in the lines defined by the second electrodes and first electrodes adjoining one sides of the second electrodes for the purpose of display. Within the second field, discharge is induced in the lines defined by the second electrodes and first electrodes adjoining the other sides of the second electrodes for the purpose of display. The first and second fields each include a reset period, an addressing period, and a sustain discharge period. The reset period is a period during which the distribution of wall charges in the plurality of display cells is uniformed. The addressing period is a period during which wall charges are produced in discharge cells according to display data. The sustain discharge period is a period during which sustain discharge is induced in the discharge cells in which wall charges are produced during the addressing period. During the reset period, discharge is induced by applying a pulse whose applied voltage varies with the passage of time.

According to the above driving method, the lines defined by all the sustain discharge electrodes are involved in the display. A feeble discharge can be induced as reset discharge. The magnitude of wall charges to be produced is limited. The produced wall charges will not affect adjoining display lines. Moreover, since the discharge is feeble, an amount of light emission is limited. Despite reset discharge, the contrast of the picture will not deteriorate remarkably.

Preferably, the method for driving a plasma display panel is such that after discharge is induced by applying the pulse, a second pulse in which an applied voltage varies with time is applied for inducing erase discharge.

According to the above driving method, erase discharge is not self-erase discharge but is induced by applying a pulse in which an applied voltage varies with time. The erase discharge can be induced reliably irrespective of a difference in characteristics from discharge cell to discharge cell or the magnitude of residual wall charges. Moreover, since the discharge is feeble, an amount of light emission is limited. Despite the erase discharge, the contrast of the picture will not deteriorate remarkably.

Further, preferably, the method for driving a plasma display panel is such that during the addressing period within the first field, a pulse of first polarity is applied to ones of the first electrodes, a pulse of second polarity is applied to the others of the first electrodes, and a scanning pulse of second polarity is applied successively to the second electrodes. During the addressing period within the second field, a pulse of first polarity is applied to the others of the first electrodes, a pulse of second polarity is applied to ones of the first electrodes, and the scanning pulse of second polarity is applied successively to the second electrodes.

According to the above driving method, the lines defined by all the sustain discharge electrodes are involved in the display. The potential difference among non-display lines occurring during the addressing period is limited, whereby the occurrence of erroneous discharge can be prevented.

According to still another aspect of typical embodiments described above of the present invention, there is provided the method for driving a plasma display panel. In the plasma display panel, pluralities of first electrodes and second electrodes are arranged parallel to each other, and a plurality of third electrodes are arranged to cross the first and second electrodes. Discharge cells defined with areas in which the electrodes cross mutually are arranged in the form of a matrix. According to the driving method, a first field and second field are temporally separated from each other. Within the first field, discharge is induced in the lines defined by the second electrodes and first electrodes adjoining one sides of the second electrodes for the purpose of display. Within the second field, discharge is induced in the lines defined by the second electrodes and first electrodes adjoining the other sides of the first electrodes for the purpose of display. The first and second fields are each composed of a field reset period and a plurality of sub-fields. Each sub-field includes a reset period, an addressing period, and a sustain discharge period. The field reset period is a period during which discharge is induced for erasing wall charges remaining at the end of a previous field. The reset period is a period during which the distribution of wall charges in a plurality of discharge cells is uniformed. The addressing period is a period during which wall charges are produced in discharge cells according to display data. The sustain discharge period is a period during which sustain discharge is induced in the discharge cells in which wall charges are produced during the addressing period.

According to the above driving method, the lines defined by all the sustain discharge electrodes are involved in display. Wall charges remaining at the end of a previous field can be erased.

Preferably, the method for driving a plasma display panel is such that the field reset period is composed of four periods. During one of the four periods, discharge is induced in the lines defined by first even-numbered electrodes and second odd-numbered electrodes. During another period, discharge is induced in the lines defined by first odd-numbered electrodes and second even-numbered electrodes. During still another period, discharge is induced in the lines defined by the first odd-numbered electrodes and second odd-numbered electrodes. During the other period, discharge is induced in the lines between the first even-numbered electrodes and second even-numbered electrodes.

According to the above driving method, wall charges produced on the electrodes, especially, on the addressing electrodes can be erased reliably.

Further, preferably, the method for driving a plasma display is such that the discharge to be induced during the field reset period is accompanied by self-erase discharge. The self-erase discharge is induced by the potential difference generated by the wall charges. The wall charges are produced with the potential at the electrodes set to the same value after reset discharge is induced by applying a pulse to the electrodes.

According to the above driving method, after reset discharge is induced, wall charges can be erased stably by self-erase discharge.

Further, preferably, the method for driving a plasma display panel is such that the first and second fields each include a field reset charge adjustment period preceding the field reset period. The field reset charge adjustment period is a period during which wall charges are produced to be superimposed on charges released during the field reset period.

According to the above driving method, field reset can be achieved stably irrespective of the states of discharge cells attained at the end of an immediately preceding field.

Further, preferably, the method for driving a plasma display panel comprises an operation of applying a first pulse in which an applied voltage varies with time, so as to induce discharge, and an operation of applying a second pulse, in which an applied voltage varies with time, so as to adjust the magnitude of wall charges produced with the first pulse. These two steps are carried out during the field reset charge adjustment period.

According to the above driving method, wall charges to be superimposed on charges released during field reset can be left at a proper magnitude. Discharge to be induced in the field reset charge adjustment period is therefore a feeble discharge.

As explained above, according to typical embodiments of the present invention, a deterioration in the contrast of the picture can be suppressed. Besides, reset discharge and subsequent erase discharge can be induced reliably in all display lines. Consequently, the states of all the cells can be reliably uniformed during the reset period. Eventually, addressing discharge can be induced stably and erroneous display can be prevented.

What is claimed is:

1. A method for driving a plasma display panel in which a plurality of first and second electrodes are arranged adjacently each other, a plurality of third electrodes are arranged to cross the first and second electrodes, the plasma display panel having a reset period, an address period, and a sustain discharge period, the method comprising:

in said reset period, applying to the second electrodes a first waveform voltage, whose applied potential increases with time to a first reached potential, and thereafter, applying to the second electrodes a second waveform voltage, whose applied potential decreases with time, wherein the second waveform voltage is applied to the second electrodes after the first waveform voltage decreases from the first reached potential to a predetermined potential with a first decreasing slope, the first decreasing slope being steeper than a second decreasing slope of the second waveform voltage, and the potential reached by the second waveform voltage has a negative polarity.

2. A method for driving a plasma display panel according to the claim 1, wherein said predetermined potential is higher than a potential before initiating the application of the first waveform voltage, and lower than the first reached potential of the first waveform voltage.

3. A method for driving a plasma display panel according to the claim 1, wherein said predetermined potential is equal to a potential at initiating the application of the first waveform voltage.

4. A method for driving a plasma display panel according to the claim 1, wherein said predetermined potential is equal to a ground potential.

5. A method for driving a plasma display panel according to the claim 1, wherein the potential reached by the second waveform voltage is higher than a selected potential, which is applied to a selected second electrode being selected by the negative polarity scan pulse among the second electrodes in the address period, but the lower than a non-selected potential, which is applied to the second electrodes other than the selected second electrode in the address period.

* * * * *

UNITED STATES PATENT AND TRADEMARK OFFICE

CERTIFICATE OF CORRECTION

PATENT NO. : 8,791,933 B2
APPLICATION NO. : 14/036720
DATED : July 29, 2014
INVENTOR(S) : Noriaki Setoguchi et al.

It is certified that error appears in the above-identified patent and that said Letters Patent is hereby corrected as shown below:

On the Title Page

Column 1, Item [71] (Applicant), Line 1-2, Delete "Hitachi Consumer Electronics Co., Ltd., Tokyo (JP)" and insert -- Hitachi Maxell, Ltd., Ibaraki-Shi (JP) --, therefor.

Signed and Sealed this
Fourth Day of November, 2014

Michelle K. Lee
*Deputy Director of the United States Patent and Trademark Office*